(12) United States Patent
Morimoto et al.

(10) Patent No.: US 8,909,422 B2
(45) Date of Patent: Dec. 9, 2014

(54) IN-VEHICLE INFORMATION SYSTEM

(75) Inventors: Kazunari Morimoto, Tokyo (JP);
Hideharu Inoue, Tokyo (JP); Tetsuya Shigeeda, Tokyo (JP); Toshiyuki Shimizu, Tokyo (JP); Junji Sukeno, Tokyo (JP); Masahide Koike, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 145 days.

(21) Appl. No.: 13/639,043

(22) PCT Filed: May 20, 2010

(86) PCT No.: PCT/JP2010/058562
§ 371 (c)(1),
(2), (4) Date: Oct. 2, 2012

(87) PCT Pub. No.: WO2011/145201
PCT Pub. Date: Nov. 24, 2011

(65) Prior Publication Data
US 2013/0211670 A1    Aug. 15, 2013

(51) Int. Cl.
*G06F 17/00*    (2006.01)
*B61D 37/00*    (2006.01)
*B61L 15/00*    (2006.01)

(52) U.S. Cl.
CPC ............... *G06F 17/00* (2013.01); *B61D 37/00* (2013.01); *B61L 15/0072* (2013.01); *B61L 15/009* (2013.01)
USPC ........................................................ 701/36

(58) Field of Classification Search
CPC .............. B61D 37/00; G06F 17/30017; G06F 17/30905; G06F 3/0304; G06F 3/04886; G06F 1/1626; G08G 1/20; G08G 1/095; G08G 61/126; G08G 1/096775; G08G 1/0969; G01S 13/723; G06Q 20/10; G01R 13/28; G01C 21/3682; G01C 21/3644; G01C 21/3476; G01C 21/367; A63F 9/18; A63F 13/10; G04G 21/08
USPC ................ 701/36, 459, 467, 532; 705/39, 52; 709/217; 340/928, 995.24, 995.28; 257/40; 345/8, 173, 156; 434/362
See application file for complete search history.

(56) References Cited

U.S. PATENT DOCUMENTS 4,821,030 A * 4/1989 Batson et al. .................. 345/173
5,150,116 A * 9/1992 West ............................. 340/928
(Continued)

FOREIGN PATENT DOCUMENTS

CN    1474991 A    2/2004
JP    10-287242 A    10/1998
(Continued)

OTHER PUBLICATIONS

International Search Report (PCT/ISA/210) issued on Aug. 24, 2010, by the Japanese Patent Office as the International Searching Authority for International Application No. PCT/JP2010/058562.
(Continued)

*Primary Examiner* — Tuan C. To
*Assistant Examiner* — Yuri Kan
(74) *Attorney, Agent, or Firm* — Buchanan Ingersoll & Rooney PC

(57) ABSTRACT

An in-vehicle information system that notifies passengers in a vehicle of guidance information, including a display input unit having a display unit that displays the guidance information and an input unit that covers the display unit and detects touch operations by the passengers to be output as input operation information, and an information control unit that switches and outputs the guidance information to the display unit according to driving states of the vehicle and classifies the guidance information into first information to be provided to the passengers according to the input operation information and second information to be provided to the passengers according to the driving states of the vehicle to output the first information to the display unit according to the input operation information.

22 Claims, 8 Drawing Sheets

(56) References Cited

U.S. PATENT DOCUMENTS

| | | | |
|---|---|---|---|
| 6,714,920 B1* | 3/2004 | Arai | 705/52 |
| 7,227,475 B1* | 6/2007 | Provenzano et al. | 340/995.24 |
| 7,356,570 B1* | 4/2008 | Tuli | 709/217 |
| 7,389,271 B2 | 6/2008 | Arai | |
| 7,791,587 B2* | 9/2010 | Kosugi et al. | 345/156 |
| 2002/0161634 A1 | 10/2002 | Kaars | |
| 2003/0071259 A1* | 4/2003 | Yoshida | 257/40 |
| 2004/0039523 A1* | 2/2004 | Kainuma et al. | 701/208 |
| 2007/0080831 A1* | 4/2007 | Miyamoto et al. | 340/995.28 |
| 2007/0182721 A1* | 8/2007 | Watanabe et al. | 345/173 |
| 2008/0262717 A1* | 10/2008 | Ettinger | 701/206 |
| 2010/0138144 A1* | 6/2010 | Goto et al. | 701/200 |
| 2010/0253602 A1* | 10/2010 | Szczerba et al. | 345/8 |
| 2011/0270742 A1* | 11/2011 | Zmuda | 705/39 |
| 2012/0178073 A1* | 7/2012 | Wasmund | 434/362 |

FOREIGN PATENT DOCUMENTS

| | | |
|---|---|---|
| JP | 11-085785 A | 3/1999 |
| JP | 2001-312238 A | 11/2001 |
| JP | 2002-074155 A | 3/2002 |
| JP | 2004-070254 A | 3/2004 |
| JP | 2004-240979 A | 8/2004 |
| JP | 2006-129942 A | 5/2006 |
| JP | 2009-015239 A | 1/2009 |
| JP | 2009-276557 A | 11/2009 |
| JP | 2010-103919 A | 5/2010 |

OTHER PUBLICATIONS

Written Opinion (PCT/ISA/237) issued on Aug. 24, 2010, by the Japanese Patent Office as the International Searching Authority for International Application No. PCT/JP2010/058562.

Office Action (Notice of Rejection) issued Aug. 6, 2013 by the Japanese Patent Office in corresponding Japanese Patent Application No. 2012-515683, and an English Translation of the Office Action. (4 pages).

Office Action from Chinese Patent Office dated Jul. 3, 2014, issued in corresponding Chinese Patent Application No. 201080066849.9, with English translation thereof. (12 pages).

\* cited by examiner

IN-VEHICLE INFORMATION SYSTEM

FIELD

The present invention relates to an in-vehicle information system that notifies passengers in a rail vehicle of various types of guidance information as typified by driving information.

BACKGROUND

A conventional in-vehicle information device mounted on a train displays information related to driving of vehicles as typified by a destination guidance, in timings according to driving states and also displays various types of information such as news received through frequency-modulation (FM) multiplex broadcasting to passengers, thereby improving services for the passengers (see, for example, Patent Literature 1 mentioned below).

There is another conventional in-vehicle information system that sequentially notifies passengers of driving information of vehicles using a display unit as typified by a liquid crystal monitor and also includes a separate display unit that notifies the passengers of general information such as various commercials (CM) and news, thereby notifying the passengers of more information (see, for example, Patent Literature 2 mentioned below).

These conventional techniques enable to unidirectionally notify the passengers of various types of guidance information such as driving information, route guidance, transfer guidance, and guidance of facilities at the next stop by collecting various types of information such as a traveling speed, a traveling location, a time, a distance between stations, a time required to travel between stations, and an open/close state of doors and displaying fixed phrases or fixed graphics prepared in advance in timings according to vehicle driving states. These conventional techniques also enable to notify the passengers of a variety of information by displaying general information such as commercials (CM) and news on the same display unit in a superimposed manner or on a display unit separately provided.

Particularly, the technique described in Patent Literature 2 includes a display unit as typified by a liquid crystal monitor having a screen vertically divided into two, and has a function, for example, to display text characters indicating the next stop as "Next stop is XX Station" (a current station next station display function) or to display train destination information, a car number, and a current time on a first divided portion. The technique described in Patent Literature 2 also displays still images of fixed phrases or fixed graphics prepared in advance on a second divided portion in timings according to vehicle driving states while sequentially switching the images. Information to be displayed on the second divided portion includes information of route guidance, transfer guidance, facility guidance, manner notice (mobile phones, priority seats), terror alert notice, door opening side guidance, driving information, sudden stop notice, notice at the time of door opening/closing, women-only car guidance, and the like, and FIG. 10 in Patent Literature 2 depicts a display example of facility guidance and transfer guidance displayed immediately before the next stop.

These conventional techniques have a fundamental operation to unidirectionally notify passengers of various types of guidance information on the vehicle in predetermined driving timings and accordingly the various types of guidance information are notified the passengers within the rail vehicle while being switched at a unit time interval.

CITATION LIST

Patent Literatures

Patent Literature 1: Japanese Patent Application Laid-open No. H10-287242 (Page 8 and FIG. 1)
Patent Literature 2: Japanese Patent Application Laid-open No. 2004-70254 (Page 6 and FIG. 1)

SUMMARY

Technical Problem

In the conventional techniques, however, because the various types of guidance information are automatically switched at a unit time interval and are notified the passengers, a passenger that has missed specific guidance information displayed once and desires to see the guidance information again needs to wait a timing when the guidance information will be displayed again or never sees the guidance information.

The present invention has been achieved in view of the above problem, and an object of the present invention is to provide an in-vehicle information system that can display various types of guidance information in timings according to vehicle driving states and also enables passengers to acquire desired guidance information in any timing.

Solution to Problem

In order to solve above-mentioned problems and achieve the object of the present invention, there is provided an in-vehicle information system that grasps a driving state of a vehicle and displays various types of information visualized on a display unit in the vehicle in a predetermined timing, the in-vehicle information system comprising: a display input unit covering a part or all of a screen area of the display unit and detecting touch operations as operation information; and an information output unit that outputs the various types of information classified in advance into optional guidance information that can be accessed by the touch operation and optionally-eliminated guidance information that cannot be accessed by the touch operation, displays the optional guidance information and the optionally-eliminated guidance information on the display unit in the predetermined timing when the input unit does not detect the operation information by the touch operation, and displays again the optional guidance information, which has displayed on the display unit, on the display unit when the input unit detects the operation information by the touch operation.

Advantageous Effects of Invention

According to the present invention, the passengers can acquire desired guidance information in any timing.

DESCRIPTION OF EMBODIMENTS

Exemplary embodiments of an in-vehicle information system according to the present invention will be explained below in detail with reference to the accompanying drawings. The present invention is not limited to the embodiments.

First Embodiment

Figure 1:
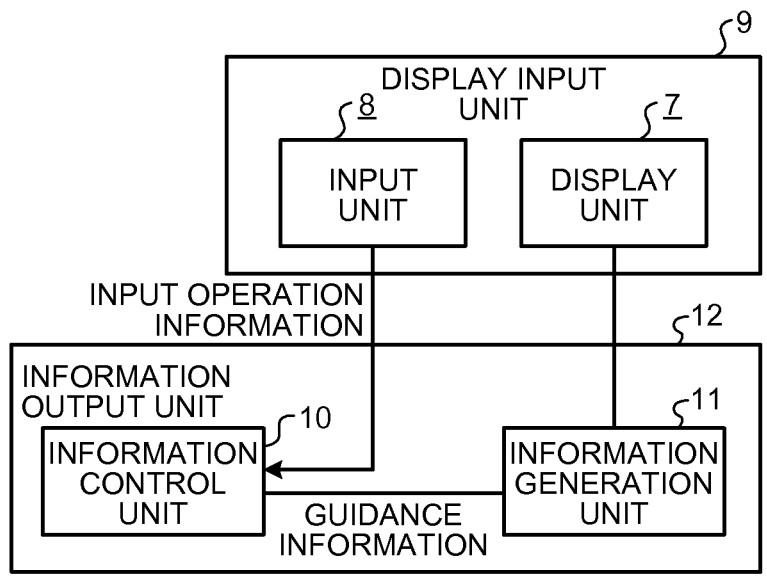
FIG. 1 depicts a configuration of an in-vehicle information system according to a first embodiment of the present invention.
Figure 2:
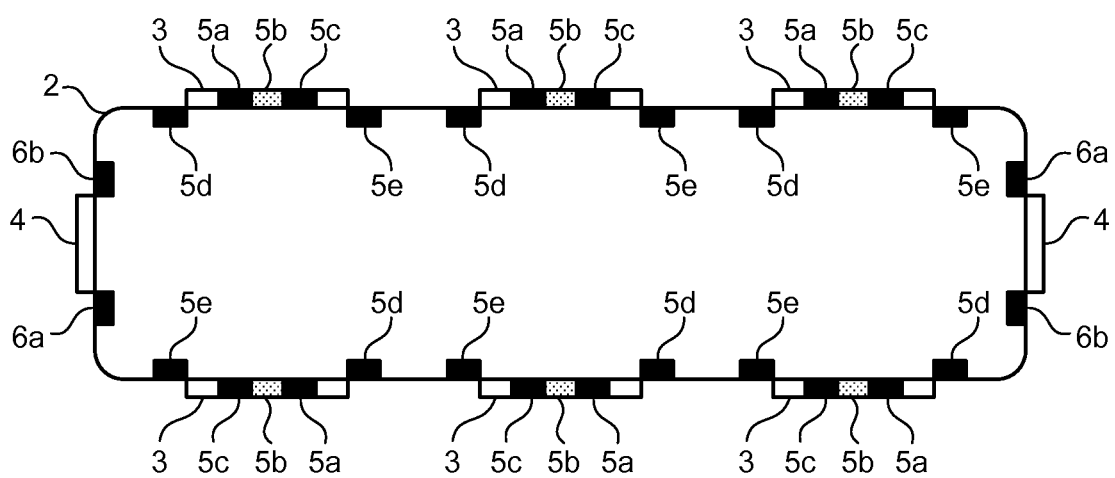
FIG. 2 is a plan view of an example of locations where a display input unit shown in FIG. 1 is installed.

FIG. 1 depicts a configuration of an in-vehicle information system according to a first embodiment of the present invention, and FIG. 2 is a plan view of an example of locations where a display input unit shown in FIG. 1 is installed.

A plurality of open/close doors 3 through which passengers ride and descend are provided on both sides of a vehicle 2 shown in FIG. 2. Connection doors 4 through which the passengers move to or from other vehicles are also provided in the vehicle 2.

In the vehicle 2 of FIG. 2, typical installation locations 5 and 6 of the display input unit 9 shown in FIG. 1 are shown. Specifically, assuming the doors 3 and 4 are seen from inside of the vehicle, the display input units 9 are installed on upper left sides 5a of the open/close doors 3, upper centers 5b of the open/close doors 3, upper right sides 5c of the open/close doors 3, left side walls 5d of the open/close doors 3, right side walls 5e of the open/close doors 3, left side walls 6a of the connection doors 4, and right side walls 6b of the connection doors 4. In addition to the installation locations 5 and 6, the display input units 9 can be installed at locations that can be easily seen by the passengers and enable easy touch operations, for example.

A display unit 7 shown in FIG. 1 is constituted by a display device as typified by a liquid crystal panel and has a function as a display monitor. Various types of visualized guidance information on stops, destination guidance, transfer stations, and the like are displayed on the display unit 7 in timings according to driving states of the vehicle 2. In this case, the "driving states of the vehicle 2" indicate a state where the vehicle 2 is stopping, traveling, or crawling and a state where the vehicle 2 is in a depot before being driven, and the "timings according to driving states of the vehicle 2" indicate a place of the vehicle 2 (such as kilometers) from a reference point, a lapse time during stopping, a lapse time during traveling, and the like.

An input unit 8 is constituted by an input element as typified by a sensing device such as a touch panel, and covers an entire area or a partial area of a display screen of the display unit 7 to obtain input operation information from passengers.

An information control unit 10 captures various types of information on the vehicle 2 such as a travel speed, a travel location, time, a distance between stations, a time required to travel between stations, and open/close states of doors and sequentially outputs various types of guidance information related to driving such as names of stations, destination guidance, and transfer stations in the timings according to driving states of the vehicle 2. The various types of guidance information output from the information control unit 10 are updated as necessary.

The information control unit 10 further captures the input operation information output from the input unit 8 when a passenger performs a touch operation to the input unit 8, and performs an output display control of optional guidance information, which is information desired by the passenger.

Figure 5:
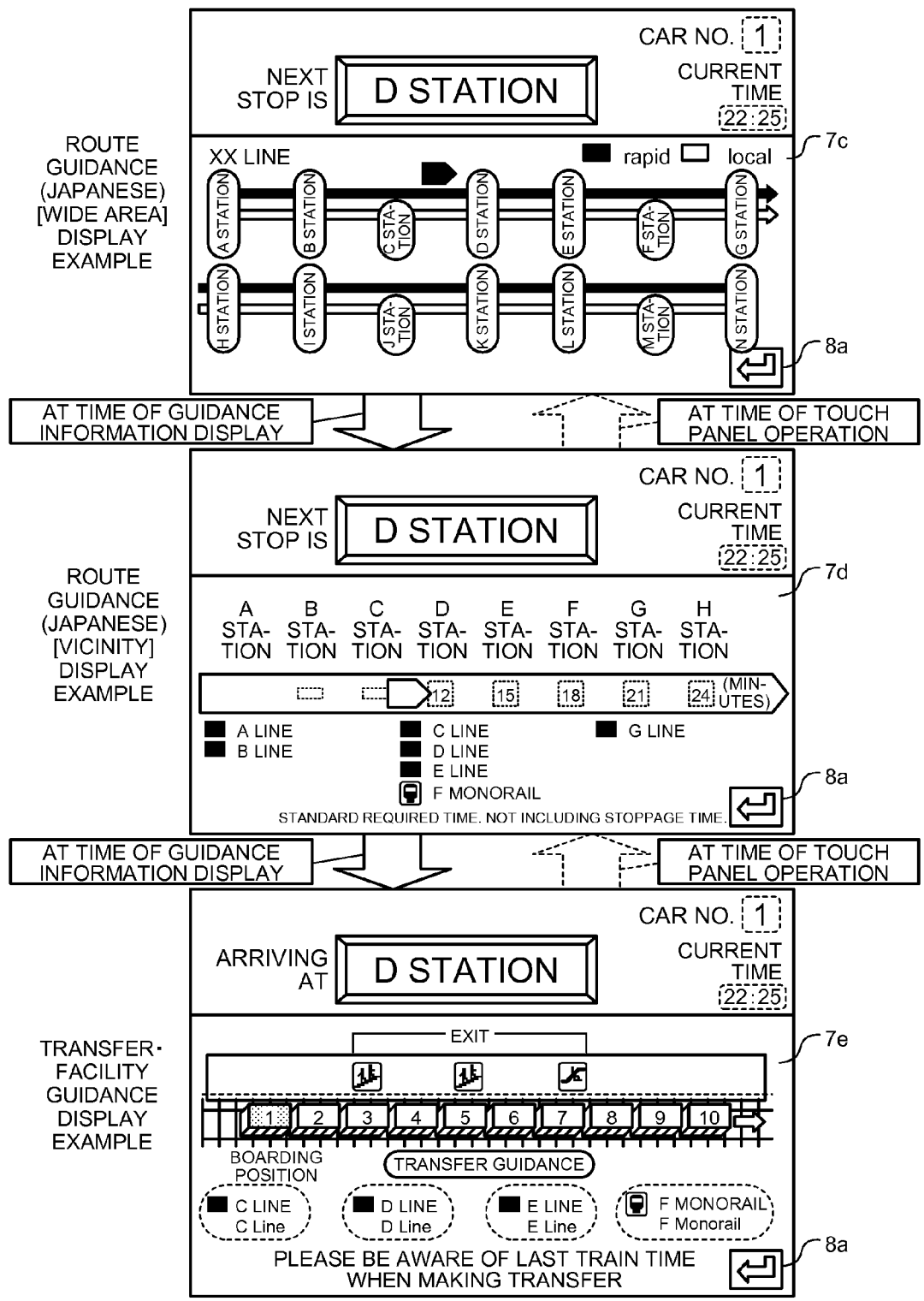
FIG. 5 is a display example of various types of guidance information to be switched and displayed by the information control unit.

An information generation unit 11 captures the various types of guidance information from the information control unit 10 and outputs the captured information to the display unit 7 as visualized guidance information as shown in FIG. 5, which will be explained later.

Figure 3:
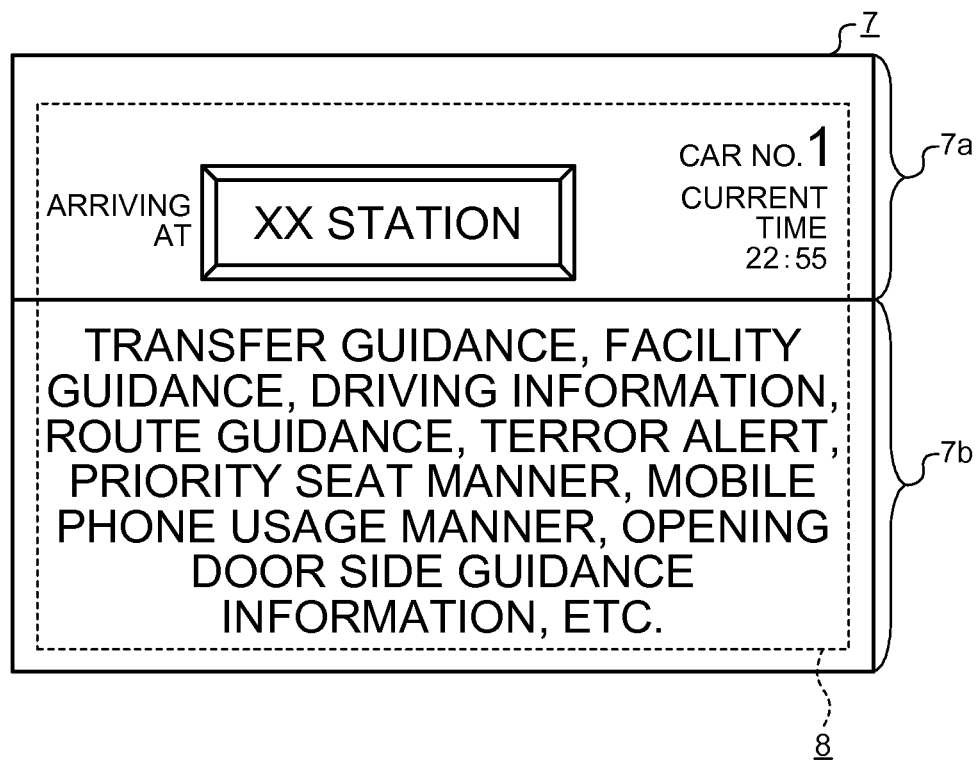
FIG. 3 is an example of guidance information displayed on a display unit shown in FIG. 1.
Figure 4:
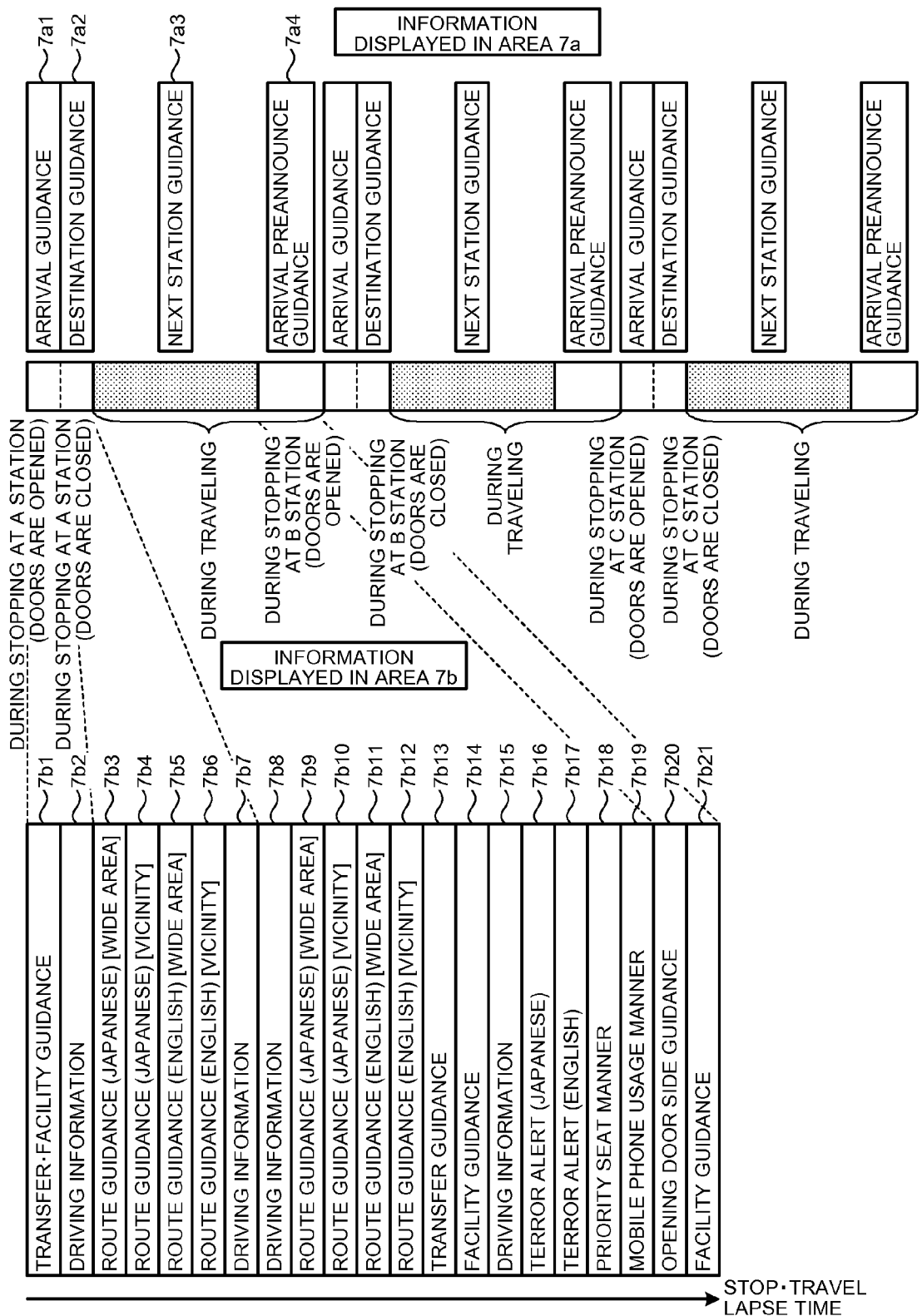
FIG. 4 is an explanatory diagram of an operation of switching various types of guidance information executed by an information control unit shown in FIG. 1.

An operation of the in-vehicle information system according to the present embodiment is explained with reference to FIGS. 3 and 4. FIG. 3 is an example of guidance information displayed on the display unit shown in FIG. 1 and FIG. 4 is an explanatory diagram of an operation of switching various types of guidance information executed by the information control unit 10 shown in FIG. 1.

(Operation of Guidance-Information Display Screen at Normal Time)

An operation of a guidance-information display screen at a normal time when a touch operation to the input unit 8 is not performed is explained first. When the vehicle 2 shown in FIG. 2 is driven on a driving schedule, the various types of guidance information captured by the information control unit 10 are transmitted to the information generation unit 11 in timings according to driving states of the vehicle 2. The information generation unit 11 regenerates visualized guidance information based on the various types of guidance information from the information control unit 10, and the visualized guidance information is displayed on the display unit 7.

An example of typical guidance information displayed on the display unit 7 is explained with reference to FIG. 3.

Text characters are mainly displayed in an area of a section 7a of the display unit 7 shown in FIG. 3. For example, the next stop is displayed as "Next stop is XX Station" (a current station next station display function) and also destination information of a train, a car number, a current time, and the like are displayed. Information such as the next stop, a station where the train is currently stopping, and the current time is displayed in this area while being sequentially switched according to driving locations of the train or the time.

Still images of fixed phrases or fixed graphics prepared in advance are sequentially switched and displayed in an area of a section 7b of the display unit 7 in timings according to driving states of the vehicle 2. The guidance information displayed in the area of the section 7b includes information of facility guidance and transfer guidance (both of which is information of the next stop) and also includes information such as a route map (current vehicle location guidance), manner notice (mobile phones, priority seats), terror alert notice, opening door side guidance, driving information, sudden stop notice (guidance information at emergency), notice at the time of door opening/closing, and women-only car guidance. The information control unit 10 sequentially switches the information according to a place of the vehicle 2 (such as kilometers) from a reference point or a lapse time during stopping or traveling and outputs the switched information.

An operation of switching the various types of guidance information executed by the information control unit 10 is explained in detail with reference to FIG. 4. FIG. 4 depicts contents displayed on the display unit 7 when the vehicle 2 stops at A Station, the open/close doors 3 are opened, then the open/close doors 3 are closed, and the vehicle 2 departs and then stops at B and C Stations, with a stop travel lapse time shown on the horizontal axis.

Text character guidance information sequentially switched and displayed in the area of the section 7a of the display unit 7 is shown in an upper area of FIG. 4, and guidance information displayed in the area of the section 7b of the display unit 7 is shown in a lower area of FIG. 4.

Display switching of the text character guidance information to be displayed in the area of the section 7a is explained first with respect to a period starting immediately after the vehicle 2 stops at A Station and until immediately before the vehicle 2 stops at B Station as an example. When the vehicle 2 stops at A Station and immediately after the open/close doors 3 are opened (while the vehicle 2 is stopping at A Station (the doors are opened)), "arrival guidance" information (7a1) such as "Now stopping at A Station" is displayed. During a period after the open/close doors 3 are closed and then the vehicle 2 departs and before the vehicle has a predetermined speed or higher (5 km/h or higher, for example) (while the vehicle 2 is stopping at A Station (the doors are closed)), "destination guidance" information (7a2) such as "Rapid train for XX Station" is displayed. During a period after the vehicle 2 has the predetermined speed or higher and before the vehicle 2 reaches a predetermined point such as xx meters short of B Station, "next station guidance" information (7a3) such as "Next stop is B Station" is displayed. Until the vehicle 2 stops at B Station and the open/close doors 3 are opened from the predetermined point such as xx meters short of B Station, "arrival preannounce guidance" information (7a4) such as "Arriving at B Station" is displayed.

The information control unit 10 repeatedly performs the display switching operation mentioned above in the same manner also after the vehicle 2 departs B Station, so that the text character guidance information is sequentially switched and displayed in the area of the section 7a. As shown in FIG. 3, information such as the car number of the train and the current time can be also displayed in the area of the section 7a, for example.

While a switching method (switching timings) for the guidance information displayed in the area of the section 7a has been explained, contents indicating "Next stop is B Station" in Japanese and different languages can be displayed while switching the languages when the "next station guidance" information (7a3) is displayed, for example. As a display example in this case, guidance information in different languages can be switched at a certain time interval (for example, every 3 seconds) or at variable time intervals (for example, a vernacular language (every 4 seconds) and other languages (every 2 seconds)) and be displayed.

When the "destination guidance" information (7a2) indicating contents common to periods before the vehicle 2 reaches the last station, such as "Rapid train for XX Station" is displayed, the "destination guidance" information (7a2) and other guidance information can be constantly displayed at the same time in the area of the section 7a, regardless of whether the vehicle 2 is stopping or traveling. As a display example in this case, the "destination guidance" information (7a2) in a reduced size can be displayed at an upper part of the area of the section 7a not to interfere with other display guidance information.

The installation locations of the display input unit 9 in the above explanations of the operation are near the open/close doors 3 as indicated by 5a, 5b, 5c, 5d, and 5e in FIG. 2. This is because opening of the open/close doors 3 is assumed. However, when the display input unit 9 is installed, for example, near the open/close doors 3 that are not opened during stopping at stations or near the connection doors 4 away from the open/close doors 3 (6a and 6b in FIG. 2), different display switching operations can be performed according to the installation locations. To explain a specific example, in the display input units 9 installed at such locations, the "arrival guidance" information (7a1) is not displayed and the "destination guidance" information (7a2) is displayed, for example, immediately after the vehicle 2 stops at a station and the open/close doors 3 are opened and until the vehicle has a predetermined speed or higher after departure.

Display switching of the various types of guidance information to be displayed in the area of the section 7b is explained with respect to a period starting immediately after the vehicle 2 stops at A Station until immediately before the vehicle 2 stops at B Station as an example. Immediately after the vehicle 2 stops at A Station and the open/close doors 3 are opened (during stopping at A Station (the doors are opened) in FIG. 4), "transfer facility guidance" information (7b1) and "driving information" (7b2) is switched and displayed. As switching methods in this case, a mode of displaying the "transfer facility guidance" information (7b1) and the "driving information" (7b2) while being switched at a predetermined time interval (an interval of 6 seconds, for example), a mode of displaying the "transfer facility guidance" information (7b1) only once for a certain time period and then continuously displaying only the "driving information" (7b2), and the like are conceivable.

The "driving information" (7b2) is information to be sequentially distributed from a driving-information distribution center to the in-vehicle information system using a digital train radio or the like, and the information control unit 10 receives the distributed information and outputs the information as the "driving information" (7b2) represented by a fixed phrase or a fixed graphic. Therefore, when much information is distributed, there is a case in which plural pieces (n pieces) of "driving information" (7b2) are displayed on the display unit 7. In such a case, the information control unit 10 displays the plural pieces of information by sequentially switching the information at a unit time interval as the "transfer facility guidance" information, "driving information 1", "driving information 2, . . . , and "driving information n".

When the display input units 9 are installed near the open/close doors 3 that do not open during stopping at stations or near the connection doors 4 (6a and 6b in FIG. 2) away from the open/close doors 3, the information control unit 10 can be configured not to output the "transfer facility guidance" information (7b1) immediately after stopping but to output guidance information to be displayed next to the "transfer facility guidance" information (7b1) to the display input units 9 installed at these locations.

During a period after the open/close doors 3 are closed and then the vehicle 2 departs and before the vehicle has a predetermined speed or higher (5 km/h or higher, for example) (during a period indicated as during stopping at A Station (doors are closed) in FIG. 4), the information control unit 10 displays various types of guidance information shown in FIG. 4 while switching the information at a certain time interval (an interval of 6 seconds, for example). The guidance information displayed during this period is "route guidance (Japanese) wide-area" information (7b3), "route guidance (Japanese) vicinity" information (7b4), "route guidance (English) wide-area" information (7b5), "route guidance (English) vicinity" information (7b6), and "driving information" (7b7), which is arranged in the display order. As an operation performed when display of all the information up to the "driving information" (7b7) displayed last is finished, a method of returning to the first "route guidance (Japanese) wide-area" information (7b3) and repeatedly displaying the guidance information that has been displayed, or a method of continuously displaying only the "driving information" (7b7) displayed last is conceivable.

During a period after the vehicle 2 has the predetermined speed or higher and before the vehicle 2 reaches a predetermined point such as xx meters short of B Station, the information control unit 10 displays various types of guidance information shown in FIG. 4 while switching the information at a certain time interval (an interval of 12 seconds, for example). The guidance information displayed in this case includes "driving information" (7b8), "route guidance (Japanese) wide-area" information (7b9), "route guidance (Japanese) vicinity" information (7b10), "route guidance (English) wide-area" information (7b11), "route guidance (English) vicinity" information (7b12), "transfer guidance" information (7b13), "facility guidance" information (7b14), "driving information" (7b15), "terror alert (Japanese)" information (7b16), "terror alert (English)" information (7b17), "priority seat manner" information (7b18), and "mobile phone usage manner" information (7b19), which is arranged in the display order. As an operation performed when display of all of information up to the "mobile phone usage manner" information (7b19) displayed last is finished, a method of returning to the first "driving information" (7b8) and repeatedly displaying the guidance information that has been displayed, or a method of continuously displaying only the "driving information" (7b15) displayed last is conceivable.

From the predetermined point such as xx meters short of B Station until the vehicle 2 stops at B Station and the open/close doors 3 are opened, the information control unit 10 displays "opening door side guidance" information (7b20) and "facility guidance" information (7b21) shown in FIG. 4 while performing switching therebetween. To perform switching in this case, a method of displaying the "opening door side guidance" information (7b20) and the "facility guidance" information (7b21) while switching therebetween at a certain time interval (an interval of 6 seconds, for example) is conceivable. The information control unit 10 repeatedly performs the display switching operation mentioned above also after the vehicle 2 departs B Station, so that the guidance information is displayed in the area of the section 7b while being sequentially switched.

While the typical switching method (switching timings) of the various types of guidance information to be displayed in the area 7b is explained, this is merely an example of the operation, and the display order of the various types of the guidance information to be displayed or contents to be displayed can be changed.

(Operation Performed at the Time of Touch Panel Operation to Guidance Information Display Screen)
(Outline of Operation)

While the operation performed when no passengers perform a touch operation while the vehicle 2 is driven on the driving schedule has been described in the above explanations, an operation performed when a passenger moves closer to the display input unit 9 installed at any of the installation locations 5 and 6 and the passenger performs a touch operation to a partial area of the input unit 8 to optionally acquire desired guidance information (hereinafter, "optional guidance information") is explained below. In the following explanations, an operation outline is explained first and then detailed operations are explained.

The operation outline is explained first. An operation performed when the various types of guidance information are switched and displayed in the area of the section 7b of the display unit 7 is explained with reference to a specific example.

FIG. 5 is a display example of the various types of guidance information to be switched and displayed by the information control unit 10. FIG. 5 depicts a case where typical three types of guidance information are focused among the various types of guidance information explained above and the focused three types of guidance information are switched at a certain time interval and displayed in the area of the section 7b.

Guidance information 7c is "route guidance (Japanese) wide-area" information, guidance information 7d is "route guidance (Japanese) vicinity" information, and guidance information 7e is "transfer facility guidance" information. FIG. 5 is an example in which these three types of guidance information are switched at a certain time interval and displayed in the order of 7c, 7d, and 7e during a normal operation with no touch operation. While there are various kinds of guidance information other than these three pieces of guidance information as information to be displayed during practical driving of a vehicle, the guidance information is limited only to the typical three types of guidance information (7c, 7d, and 7e) in this case to simplify explanations.

The in-vehicle information system of the present invention is configured to have the display units 7 each covered with a touch panel (the input unit 8), thereby enabling the information control unit 10 to obtain input operation information through a touch operation to the input unit 8 by a passenger, and performs an operation explained below in addition to the display operation in the conventional technology. While a case in which the input unit 8 covers the entire area of a display screen of the display unit 7 is assumed in the following explanations of the operation, only a part of the screen area can be covered according to applications.

A part of the screen area of the display unit 7 is defined as an area that accepts a touch operation by the passengers. For example, an input operation area 8a indicated by a specified fixed graphic is provided within the display screen for the various type of guidance information to notify the fact that there is an area in which a touch operation is available, as shown in FIG. 5. The input operation area 8a is not limited to the graphic as shown in FIG. 5 but can be constituted by a specified fixed phrase such as "previous display" or "next display".

When a passenger performs a touch operation to the input operation area 8a and when, for example, the "transfer facility guidance" information 7e is being displayed on the display unit 7, the information control unit 10 detects the input operation information and performs an operation of returning to the "route guidance (Japanese) vicinity" information 7d which has been already displayed. When the passenger performs another touch operation to the input operation area 8a, the information control unit 10 performs an operation of returning to the "route guidance (Japanese) wide area" information 7c.

To summarize the operation outline, while the various types of guidance information are displayed on the display unit 7, the information control unit 10 captures the input operation information from a passenger and performs an operation of switching display contents from the guidance information currently displayed to the last guidance information which has been already displayed each time the passenger performs a touch operation to the input operation area 8a. That is, the information control unit 10 performs an operation of switching display one after another from new guidance information to old guidance information each time a passenger performs a touch operation to the input operation area 8a.

While the information control unit 10 is configured to display plural pieces of the guidance information that have been already displayed while sequentially switching the information upon touch operations to the input operation area 8a by a passenger in the above explanations, it can be configured to display only some of the pieces of the guidance information that have been already displayed. That is, by previously defining some of the pieces of the information to be displayed when a passenger performs a touch operation as optional guidance information, the information control unit 10 performs a display operation limited to the specific pieces of guidance information (which is explained in the detailed operation).

The information control unit 10 can be configured not to perform the guidance-information switching operation at the certain time interval (an normal guidance-information display operation) as the conventional operation until a certain time has passed after touch operations by a passenger end. In other words, the information control unit 10 automatically returns to the normal guidance-information display operation when the certain time has passed after the touch operations end (which is explained in the detailed operation).

Configuration examples of input operation areas are explained with reference to FIG. 6.

Figure 6:
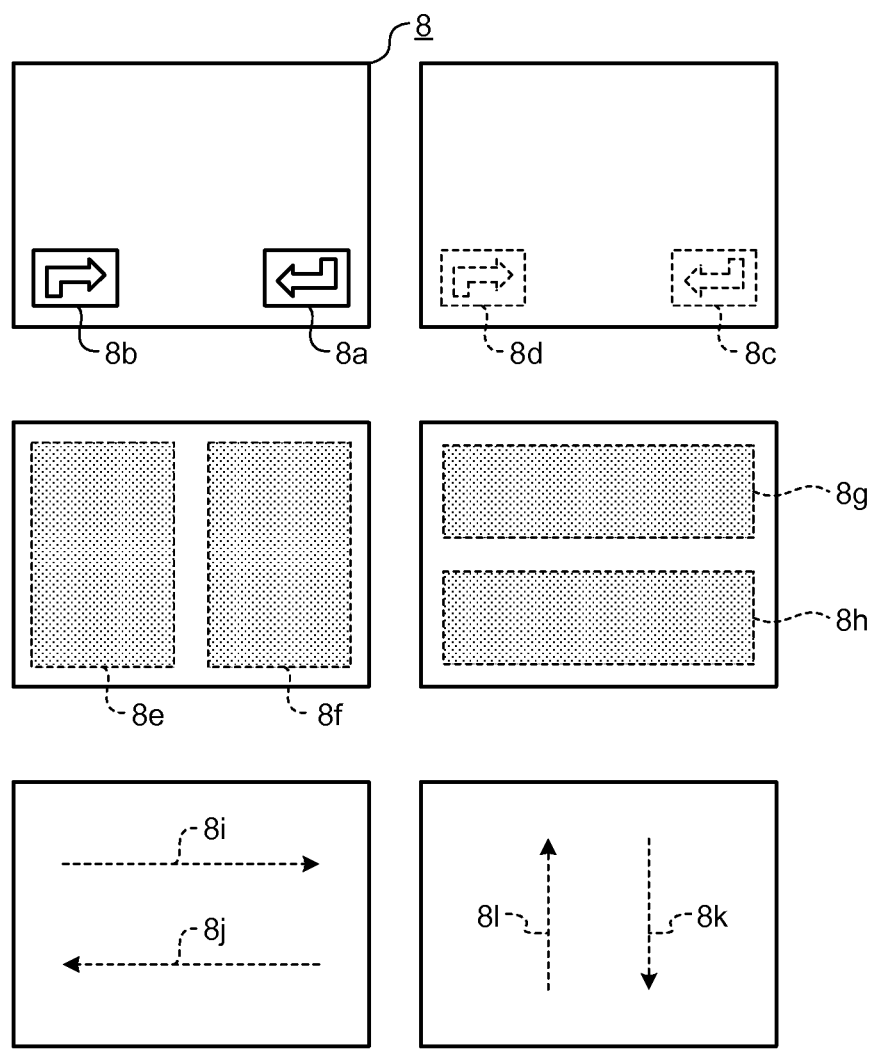
FIG. 6 is an explanatory diagram of input operation areas in an input unit shown in FIG. 1.

FIG. 6 is an explanatory diagram of input operation areas in the input unit shown in FIG. 1. The input operation area 8a and an input operation area 8b shown in FIG. 6 are provided symmetrically with respect to a center line of the input unit 8. By providing another input operation area 8b in this way, the information control unit 10 performs an operation of switching the guidance information from old information to new information each time a passenger performs a touch operation to the input operation area 8b (which is explained in the detailed operation).

An input operation area 8c and an input operation area 8d shown in FIG. 6 are translucent. By providing the translucent input operation areas in this way, loss of visibility in the guidance information displayed on the display unit 7 can be prevented, so that the passengers can perform touch operations while recognizing the areas enabling touch operations to some extent. When the input operation areas are translucent, overlay display of the optional guidance information and the input operation area can be achieved.

As another definition of input operation areas and operation method, it is possible to provide two transparent areas (input operation areas 8e and 8f extending in the vertical direction or input operation areas 8g and 8h extending in the horizontal direction) as shown in FIG. 6, for example. Sizes of the areas can be freely set within the area of the input unit 8. In this case, the information control unit 10 performs an operation of switching the guidance information from new information to old information when a passenger performs a touch operation to the input operation area 8e or 8g, and performs an operation of switching the guidance information from old information to new information when a passenger performs a touch operation to the input operation area 8f or 8h. The switching directions for the input operation areas can be defined opposite to those in the operation mentioned above.

As still another definition of input operation areas and operation method, the information control unit 10 can be configured to switch the guidance information by detecting input operation information 8i, 8j, 8l, or 8k having directions and detecting a difference in the operation direction, for example. An input operation area in this case is the entire screen area or a partial screen area of the input unit 8. Accordingly, when a passenger performs an input operation having a direction, the information control unit 10 detects a difference in the direction of the input operation information and performs an operation of switching the guidance information.

The input operation information having the directions and directions of switching of the guidance information by the information control unit 10 are explained in association with each other. For example, when detecting the input operation information 8j or 8l, the information control unit 10 performs an operation of switching the guidance information from new information to old information. When detecting the input operation information 8i or 8k, the information control unit 10 performs an operation of switching the guidance information from old information to new information. The switching directions for the input operation areas can be defined opposite to those in the operation explained above.

At the time of an input operation having a direction, the information control unit 10 can be configured to determine a switching order of the guidance information according to the direction and also detect information of an acceleration of the input operation, thereby increasing or decreasing the number of pieces of the guidance information to be switched for one touch operation between one and a maximum of N according to the acceleration of the input operation. That is, the information control unit 10 performs an operation of increasing the number of pieces of the guidance information to be switched as the acceleration of an input operation increases.

(Detailed Operation)

A detailed operation of the information control unit 10 performed when a passenger performs a touch operation to the input unit 8 is explained below.

Figure 7:
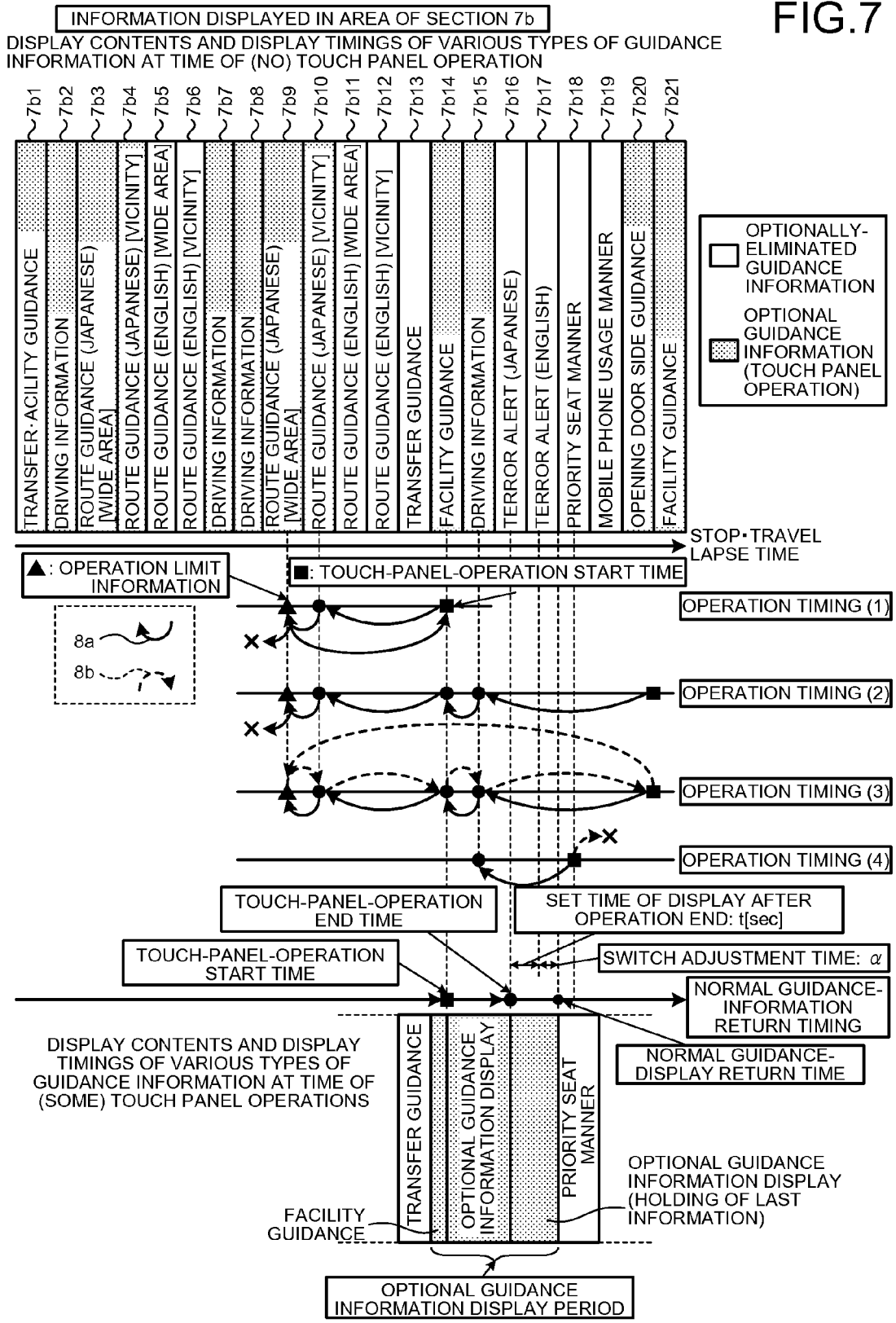
FIG. 7 is an explanatory diagram of a display operation of optional guidance information performed by the information control unit shown in FIG. 1.

FIG. 7 is an explanatory diagram of a display operation of the optional guidance information, performed by the information control unit shown in FIG. 1, with a stop•travel lapse time shown on the horizontal axis. Display contents of the various types of guidance information to be displayed in the area of the section 7b when there is no touch operation and switching display timings thereof are shown in an upper area of FIG. 7. The guidance information is the same as the guidance information 7b1 to 7b21 shown in FIG. 4.

Among the various types of guidance information 7b1 to 7b21 shown in FIG. 4, guidance information not displayed when the passengers perform touch operations is specified in the information control unit 10 as optionally-eliminated guidance information. This specification can be performed by an operator or an operating company of the vehicle 2. When a passenger performs touch operations to the input unit 8, the information control unit 10 performs an operation of displaying only the optional guidance information, which is obtained by eliminating the previously-specified optionally-eliminated guidance information from the various types of guidance information already displayed. The optionally-eliminated guidance information is guidance information for which touch operations by the passengers are considered to be unnecessary.

When the optionally-eliminated guidance information is not specified, the information control unit 10 performs an operation of displaying all of the various types of guidance information already displayed as the optional guidance information. However, there is an operation restriction based on "operation limit information", which is explained later.

FIG. 7 is an example of the optionally-eliminated guidance information and the optional guidance information specified in the information control unit 10. For example, among the various types of guidance information 7b1 to 7b21, the "route guidance (English) wide-area" information (7b5 and 7b11), the "route guidance (English) vicinity" information (7b6 and 7b12), the "transfer guidance" information (7b13), the "terror alert (Japanese)" information (7b16), the "terror alert (English)" information (7b17), the "priority seat manner" information (7b18), and the "mobile phone usage manner" information (7b19) is specified as the optionally-eliminated guidance information and the other information is specified as the optional guidance information. As a method of specifying the optionally-eliminated guidance information, there is a method of specifying guidance information for which redisplay is considered to be unnecessary at the time of touch operations, such as the "priority seat manner" information and the "mobile phone usage manner" information, for example.

Two kinds of arrows are shown in FIG. 7 and solid arrows indicate display operations performed by the information control unit 10 when a passenger performs touch operations to the input operation area 8a while dotted arrows indicate display operations performed by the information control unit 10 when a passenger performs touch operations to the input operation area 8b.

An operation timing (1) in FIG. 7 shows a display switching example in a case where guidance information contents at the start of a touch panel operation by a passenger are "facility guidance" information (7b14). When the optionally-eliminated guidance information is specified as shown in FIG. 7, the information control unit 10 performs an operation of displaying the "route guidance (Japanese) vicinity" information (7b10) on the display unit 7 by skipping the "transfer guidance" information (7b13), the "route guidance (English) vicinity" information (7b12), and the "route guidance (English) wide-area" information (7b11) when a passenger performs a touch operation to the input operation area 8a once. When the passenger performs another touch operation to the input operation area 8a, the information control unit 10 displays the "route guidance (Japanese) wide-area" information (7b9). When another touch operation by the passenger follows, the information control unit 10 performs an operation of displaying the "driving information" (7b8). By previously specifying the operation limit information in the information control unit 10, accesses to older information can be prevented.

In FIG. 7, the "route guidance (Japanese) wide-area" information (7b9) is specified as the operation limit information as an example, and the operation timing (1) in FIG. 7 depicts a switching operation performed when the operation limit information is specified. When the operation limit information is specified, the information control unit 10 performs an operation of holding display of the "route guidance (Japanese) wide-area" information (7b9) without shifting to the "driving information" (7b8), which is guidance information with a display timing immediately before, no matter how many touch operations to the input operation area 8a the passenger performs.

Instead of performing the operation of holding the display of the "route guidance (Japanese) wide-area" information (7b9) upon consecutive touch operations to the input operation area 8a by a passenger, the information control unit 10 can be configured to perform an operation of returning to information that had been displayed when the passenger first performed the touch operation, and to successively perform display operations of the optional guidance information between the operation limit information and the information that had been displayed at the time of the first touch operation each time the touch operation is performed. That is, when the "route guidance (Japanese) wide-area" information (7b9) is displayed and then the passenger performs another touch operation to the input operation area 8a, the information control unit 10 performs an operation of returning to the "facility guidance" information (7b14) that had been displayed at the time of the first touch operation and displaying the information, and then repeatedly performs the operations mentioned above each time the passenger performs the touch operation.

There are, for example, two typical methods of defining the operation limit information. One of the definition methods is a method of defining displayable guidance information specific pieces before the guidance information at the start of the touch panel operation, as the operation limit information. In the case of the operation timing (1) as an example, the "route guidance (Japanese) wide-area" information (7b9) as the operation limit information is guidance information two pieces (except for the optionally-eliminated guidance information) before the "facility guidance" information (7b14) which is guidance information at the start of the operation. That is, in the example shown in FIG. 7, the "route guidance (Japanese) wide-area" information (7b9) corresponds to the "displayable guidance information specific pieces before" mentioned above. In this case, the operation timing (1) in FIG. 7 depicts an operation performed when the guidance information two pieces before is defined as the operation limit information.

As the other definition method, a method of defining specific guidance information except for the optionally-eliminated guidance information among the guidance information displayed before the guidance information at the start of the touch panel operation as the operation limit information is conceivable. In the case of the operation timing (1) as an example, the "route guidance (Japanese) wide-area" information (7b9) is specific guidance information defined as the operation limit information. In this case, the information control unit 10 performs an operation of displaying all pieces of the guidance information (except for the optionally-eliminated guidance information) that had been displayed before the "facility guidance" information (7b14) at the start of the operation, back in time until the "route guidance (Japanese) wide-area" information (7b9) is displayed.

While the typical two methods of defining the operation limit information have been explained above, the information control unit 10 can use either definition method according to driving statuses of the vehicle 2.

An operation timing (2) in FIG. 7 shows an example of display switching performed when the guidance information at the start of a touch panel operation by a passenger is the "opening door side guidance" information (7b20), which is different from that in the operation timing (1). When a passenger performs a touch operation to the input operation area 8a once under a situation where the "opening door side guidance" information (7b20) is displayed on the display unit 7, the information control unit 10 displays the "driving information" (7b15) on the display unit 7 while skipping the manner information (7b18 and 7b19) and the terror alert information (7b16 and 7b17) previously specified as the optionally-eliminated guidance information.

When the passenger performs another touch operation to the input operation area 8a, the information control unit 10 displays the "facility guidance" information (7b14). The information control unit 10 then performs operations of displaying the "route guidance (Japanese) vicinity" information (7*b*10) and of displaying the "route guidance (Japanese) wide-area" information (7*b*9) each time the passenger performs another touch operation. When the operation limit information is the "route guidance (Japanese) wide-area" (7*b*9), the information control unit 10 does not display older guidance information and performs an operation of holding display of the "route guidance (Japanese) wide-area" information (7*b*9).

An operation timing (3) in FIG. 7 shows an example of display switching performed when a touch operation to a different input operation area is performed in addition to the operation shown in the operation timing (2). In this case, operations until the operation of the information control unit 10 to display the "route guidance (Japanese) wide-area" information (7*b*9), which are caused by consecutive touch operations to the input operation area 8*a* by a passenger are the same as those shown in the operation timing (2). When the passenger subsequently performs a touch operation to the different input operation area 8*b*, the information control unit 10 performs an operation of switching to the guidance information shown on the right side in FIG. 7.

For example, when a passenger causes the "route guidance (Japanese) wide-area" information (7*b*9) to be displayed and then performs a touch operation to the input operation area 8*b*, the information control unit 10 performs an operation of displaying the "route guidance (Japanese) vicinity" information (7*b*10). When the passenger continues the touch operations to the input operation area 8*b*, the information control unit 10 performs an operation of displaying each piece of the optional guidance information until the "opening door side guidance" information (7*b*20), which is contents of the guidance information at the start of the touch panel operation, while switching the information. Even when the passenger subsequently continues the touch operation to the input operation area 8*b*, the information control unit 10 performs an operation of holding display of the "opening door side guidance" information (7*b*20).

Instead of performing the operation of holding the display of the "opening door side guidance" information (7*b*20) by the consecutive touch operations to the input operation area 8*b*, the information control unit 10 can be configured to perform an operation of returning to the information that had been displayed at the time of the first touch operation by the passenger and then continuously perform the operation of displaying the optional guidance information between the operation limit information and the information that had been displayed at the first touch operation, each time the touch operation is performed. That is, when a passenger causes the "opening door side guidance" information (7*b*20) to be displayed and then performs another touch operation to the input operation area 8*b*, the information control unit 10 can perform an operation of returning to and displaying the "route guidance (Japanese) wide-area" information (7*b*9) as the operation limit information and then repeatedly perform the operations mentioned above each time the touch operation is performed.

In the above explanations of the operations in the operation timings (1), (2), and (3), a touch-operation lapse time is not considered. Details of an operation considering the touch-operation lapse time are additionally explained.

To explain the operation example shown in the operation timing (3), there may be a case in which the guidance information contents at the start of the touch panel operation by a passenger is the "opening door side guidance" information (7*b*20) and the information control unit 10 is proceeding to an operation of displaying the "facility guidance" information (7*b*21), which is guidance information expected to be displayed next, on the other display input units 9 while the passenger continuously performs the touch operation to the input operation area 8*a* or 8*b*. In such a case, latest guidance information to be displayed last by the consecutive touch operations to the input operation area 8*b* can be newly-displayed information (the "facility guidance" information (7*b*21) in this case). However, when the newly-displayed guidance information is the optionally-eliminated guidance information, an operation of displaying latest guidance information except for the optionally-eliminated guidance information is performed.

Details of an operation limited to the time of start of the touch panel operation by a passenger are explained with reference to an operation timing (4) shown in FIG. 7. When guidance information displayed at the start of the touch panel operation by a passenger is the optionally-eliminated guidance information such as the "priority seat manner" information (7*b*18) as shown in FIG. 7, guidance information to be displayed first at the first touch operation to the input operation area 8*a* by the passenger is the latest guidance information among the optional guidance information already displayed (the "driving information") (7*b*15) in this case).

When a passenger directly performs a touch operation to the input operation area 8*b* at the start of the touch panel operation, the guidance information displayed at that time (the "priority seat manner" information (7*b*18) in FIG. 7) is the latest guidance information and thus the information control unit 10 performs an operation of rejecting the input operation information from the input unit 8.

Alternatively, the information control unit 10 can perform an operation of returning to the operation limit information by the touch operation to the input operation area 8*b* as explained in the operation of the operation timing (3).

An operation performed when the information control unit 10 performs a control to automatically return to the normal guidance-information display operation and when there is no touch operation to the input unit 8 by the passengers for a certain period of time is explained below.

A normal guidance-information return timing shown in FIG. 7 indicates an example of this operation performed by the information control unit 10. In this example, display timings of optional guidance information that is displayed when guidance information at the start of a touch panel operation by a passenger is the "facility guidance" information (7*b*14) are shown. As described above in the operation explanations, the optional guidance information to be displayed can be freely switched according to details of touch operations to the input operation areas 8*a* and 8*b*. When an end time of the touch operation to the input unit 8 by a passenger is a touch-panel-operation end time as shown in FIG. 7 (in the middle of the "terror alert (Japanese)" information (7*b*16) displayed during the normal guidance-information display operation), the information control unit 10 continuously displays the optional guidance information displayed last by the touch operation of the passenger until a certain time (t seconds) previously set has passed and then performs an operation of switching to the normal guidance-information display operation. The normal guidance-information return timing mentioned above indicates the time when t seconds have passed.

The information control unit 10 can perform the switching operation after a time period, which is obtained by adding a switch adjustment time: $\alpha$ to a set time of display after operation end: t (seconds), to synchronize a timing of switching to the normal guidance-information display operation in one of the display input units 9 with a timing of switching to the normal guidance information display on the other display input units 9 to which no touch operation by the passengers is performed. By performing this operation, such an uncomfortable operation that the normal guidance information displayed after automatic return is suddenly switched to the guidance information to be displayed next to the displayed normal guidance information in some return timings can be prevented.

The newly-defined switch adjustment time: α indicates an adjustment add time required to perform this operation. That is, the information control unit 10 continuously displays the optional guidance information on the display input unit 9 for which the touch operation by a passenger ends during the certain time previously set (the set time of display after operation end: t (seconds)) and then does not immediately switch display contents. The information control unit 10 then performs the normal guidance-information display operation to the display input unit 9 to be synchronized with a timing of the normal guidance-information display switching performed in the other display input units 9 to which no touch operation by the passengers is performed (a timing after the time period obtained by adding the switch adjustment time: α).

A specific example of this operation is explained based on the normal guidance-information return timing shown in FIG. 7. In this example, a timing t seconds after the end of the touch panel operation by a passenger is a timing while the "terror alert (English)" information (7b17) is being displayed. The information control unit 10 then performs an operation of continuously displaying the displayed optional guidance information until the timing of display switching to the "priority seat manner" information (7b18) which is expected to be displayed next to the displayed optional guidance information (a timing obtained by adding the switch adjustment time: α), and then performs an operation of synchronously switching to the "priority seat manner" information (7b18) in the timing obtained by adding α.

The synchronous switching to the normal guidance information mentioned above can be applied even when a situation where touch operations by the passengers are performed to all of the display input units 9 installed in the vehicle and the optional guidance information is displayed on all of the display units 7 occurs, for example. It implies that there is no display unit 7 that is performing the normal guidance information display in the vehicle in this case. However, because the information control unit 10 always knows the normal guidance information display contents and display timings thereof in the background, the synchronous switching to the normal guidance information can be independently realized in each display input unit 9 even in such a situation that the normal guidance information is not displayed in any display unit 7.

As another operation of the information control unit 10, when an event that requires to display emergency guidance information to be transferred to the passengers occurs during the operation of performing switching synchronously with the normal information display switching timing, there is an operation of switching to and displaying the emergency guidance information (not shown) in priority to the operation performed during waiting for the synchronous switching to the normal information. When a need to display the emergency guidance information arises, the information control unit 10 immediately performs display switching to the emergency guidance information and also an operation of rejecting the input operation information from the input unit 8 even if there are display input units 9 that are displaying the optional guidance information. Furthermore, even when this operation occurs during the period (t (seconds)+α) of waiting for the synchronous switching in such a case that there is no touch operation to the input unit 8 for a certain time period after display of the optional guidance information, the information control unit 10 immediately performs the operation of display switching to the emergency guidance information, thereby realizing prompt information transfer to the passengers.

Whether the optional guidance information having been displayed before display of the emergency guidance information is continuously displayed or the normal guidance information is displayed after the display of the emergency guidance information on the display input unit 9 to which the touch operation had been performed by a passenger can be arbitrarily set with respect to each installation location of the display input unit 9. For example, a method of setting the display input units 9 installed near the open/close doors 3 in FIG. 2 (the upper left sides 5a, the upper centers 5b, the upper right sides 5c, the left side walls 5d, and the right side walls 5e) to perform an operation of returning to the normal guidance information display and setting the display input units 9 installed in the other installation locations to perform an operation of returning to the display contents of the optional guidance information that had been displayed before display of the emergency guidance information is conceivable.

The in-vehicle information system according to the present embodiment includes: display input units 9 that each have a display unit 7 that displays the various types of information to users in a vehicle and an input unit 8 covering a part or all of the screen area of the display unit 7 to detect touch operations by users, and that are arranged at locations enabling the users to see the units and to perform touch operations to the input units 8; and an information output unit 12 that outputs the various types of information divided into the optional guidance information that can be optionally accessed by the users and the optionally-eliminated guidance information that cannot optionally be accessed by the users and visualized with predetermined fixed phrases or predetermined fixed graphics in predetermined timings (timings according to the driving statuses of the vehicle 2) to the display unit 7 by recognizing a driving status of the vehicle and that also performs a control to output the optional guidance information desired by the users performing touch operations to the input operation areas provided in the input units 8 to the display unit 7, by performing the processes above mentioned. Therefore, relative to the conventional system that automatically switches the various types of guidance information at a unit time interval to notify users of a rail vehicle of the guidance information, guidance information that is considered not to require touch operations from the passengers is previously eliminated as the optionally-eliminated guidance information from the various types of guidance information unidirectionally notified the passengers in the conventional system, and the optional guidance information meeting a request from an individual passenger can be obtained at a time demanded by the passenger.

When there is no touch operation to the input unit 8 by the users for a certain time during the display output of the optional guidance information to the display unit 7, the information output unit 12 stops outputting the optional guidance information and automatically returns to the normal information display screen and the normal display operation of outputting the various types of information to the display unit 7 in predetermined timings (timings according to the driving statuses of the vehicle 2). Accordingly, even if a passenger having been performed the touch operation leaves the spot while the optional guidance information displayed until then is kept as it is, other passengers can automatically acquire necessary normal guidance information after a predetermined time.

A plurality of the display input units 9 to which the touch operation can be performed are mounted on the vehicle, and the information output unit 12 synchronizes timings of automatically returning to the normal information display screen and the normal display operation with the normal information display switching timing of the various types of information displayed on the display input units 9 to which no touch operation is performed. Accordingly, such an uncomfortable display switching operation that the normal guidance information displayed after automatic return is suddenly switched can be prevented.

When an event requiring display of emergency guidance information to be transferred to the users occurs during the switching operation synchronous with the normal information display switching timing, the information output unit 12 switches to and displays the emergency guidance information in priority to the operation of waiting for the synchronous switching to the normal information, thereby promptly transmitting urgent matters to the passengers.

The touch-operation enabling areas (the input operation areas 8a and 8b) visualized with the predetermined fixed phrases or the predetermined fixed graphics are clearly indicated in parts of the screen areas of the display units 7, and the information output unit 12 outputs to the display unit 7 the optional guidance information desired by the users performing touch operations to the touch-operation enabling areas, thereby enabling the passengers to acquire the desired optional guidance information by the touch operations to the input operation areas. Therefore, the passengers can reliably perform the operation of acquiring the optional guidance information with the input operation areas to be subjected to the touch operations being clearly recognized.

The touch-operation enabling areas (the input operation areas 8c and 8d) visualized with the translucent predetermined fixed phrases or the translucent predetermined fixed graphics are clearly indicated in parts of the screen area of each display unit 7, and the information output unit 12 outputs to the display unit 7 the optional guidance information desired by the users performing the touch operations to the touch-operation enabling areas, thereby enabling the passengers to acquire the desired optional guidance information by the touch operations to the input operation areas. Therefore, the passengers can perform the operation of acquiring the optional guidance information with the input operation areas to be subjected to the touch operations being recognized to some extent, and the translucent input operation areas enable simultaneous guidance display superimposed on the display contents of the optional guidance information.

The transparent touch-operation enabling areas (the input operation areas 8e, 8f, 8g, and 8h) are provided in parts of the screen area of each display unit 7, and the information output unit 12 outputs to the display unit 7 the optional guidance information desired by the users performing the touch operations to the touch-operation enabling areas, thereby enabling the passengers to acquire the desired optional guidance information by the touch operations to the input operation areas. Therefore, display contents of the optional guidance information are not interfered with and the operation of acquiring the optional guidance information can be facilitated by expanding the input operation areas.

The transparent touch-operation enabling areas (the input operation areas 8i, 8j, 8k, and 8l) are provided in a part or all of the screen area of each display unit 7, and the information output unit 12 outputs to the display unit 7 the optional guidance information desired by the users performing touch operations having directions, thereby enabling the passengers to perform touch operations to the input operation areas to acquire the desired optional guidance information. Therefore, the passengers can perform an instinctive operation of acquiring the optional guidance information without seeing the display screen contents of the display input unit 9 and also prevents malfunctions by erroneous touch operations.

The transparent touch-operation enabling areas (the input operation areas 8i, 8j, 8k, and 8l) are provided in a part or all of the screen area of each display unit 7, and the information output unit 12 outputs to the display unit 7 the optional guidance information desired by the users performing touch operations having directions and accelerations, thereby enabling the passengers to perform the touch operations to the input operation areas to acquire the desired optional guidance information. Therefore, the passengers can perform an instinctive operation of acquiring the optional guidance information without seeing the display screen contents on the display input unit 9 and perform an operation of switching plural pieces of guidance information at one time, and also malfunctions caused by erroneous touch operations can be prevented.

Second Embodiment

While the embodiment of the in-vehicle information system in which passengers can freely perform touch operations in all driving statuses of the vehicle 2 from the time when the vehicle 2 is stopping to the time when the vehicle 2 is traveling, regardless of the installation locations of the display input units 9 has been explained above, a case where the passengers can perform the touch operations only under specific driving statuses of the vehicle 2 is explained in the present embodiment.

A second embodiment of the present invention is explained below with reference to the drawings. Only operations added to that of the first embodiment are explained below.

Figure 8:
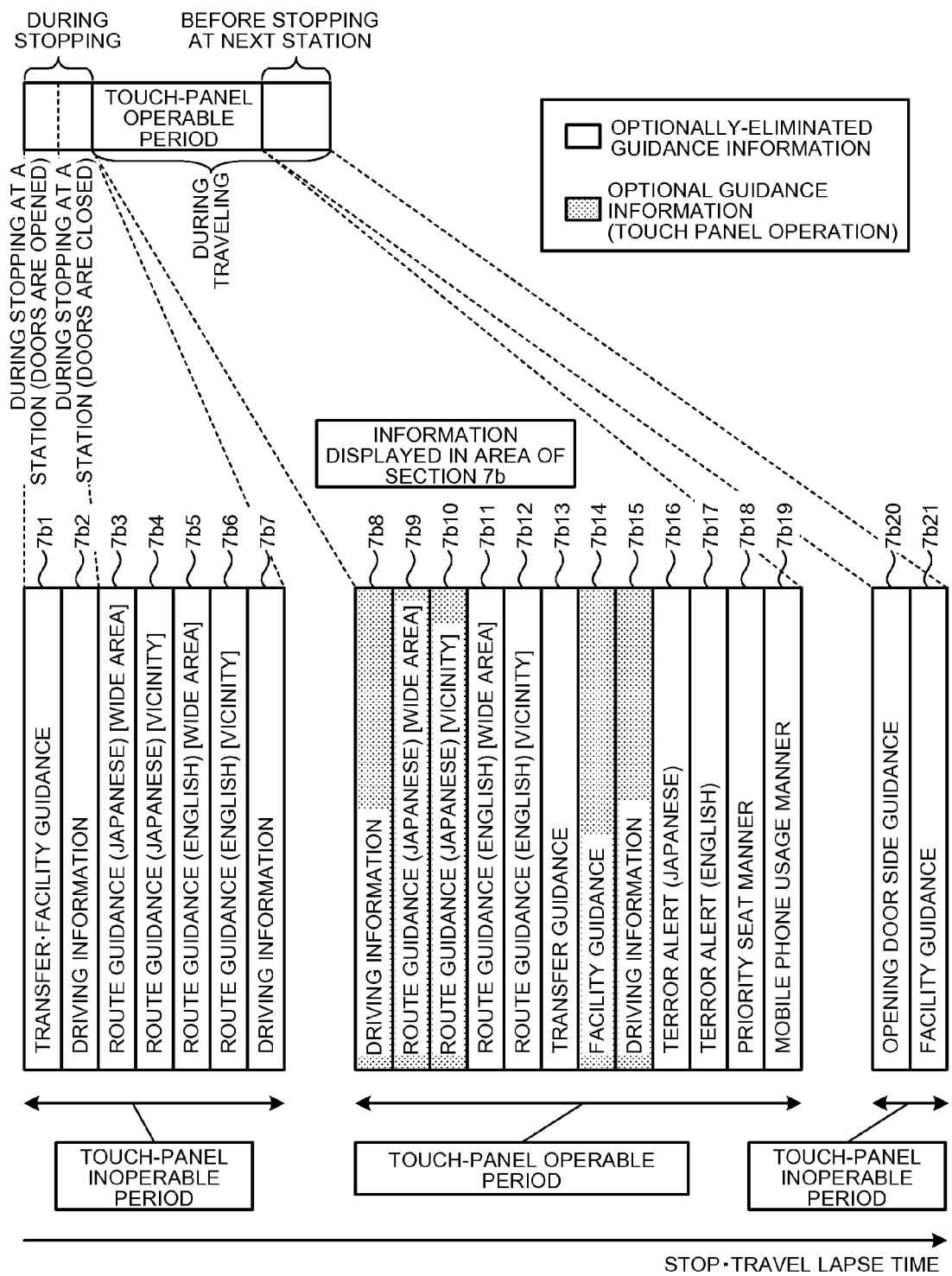
FIG. 8 is an explanatory diagram of a display operation performed by an information control unit according to a second embodiment.
Figure 9:
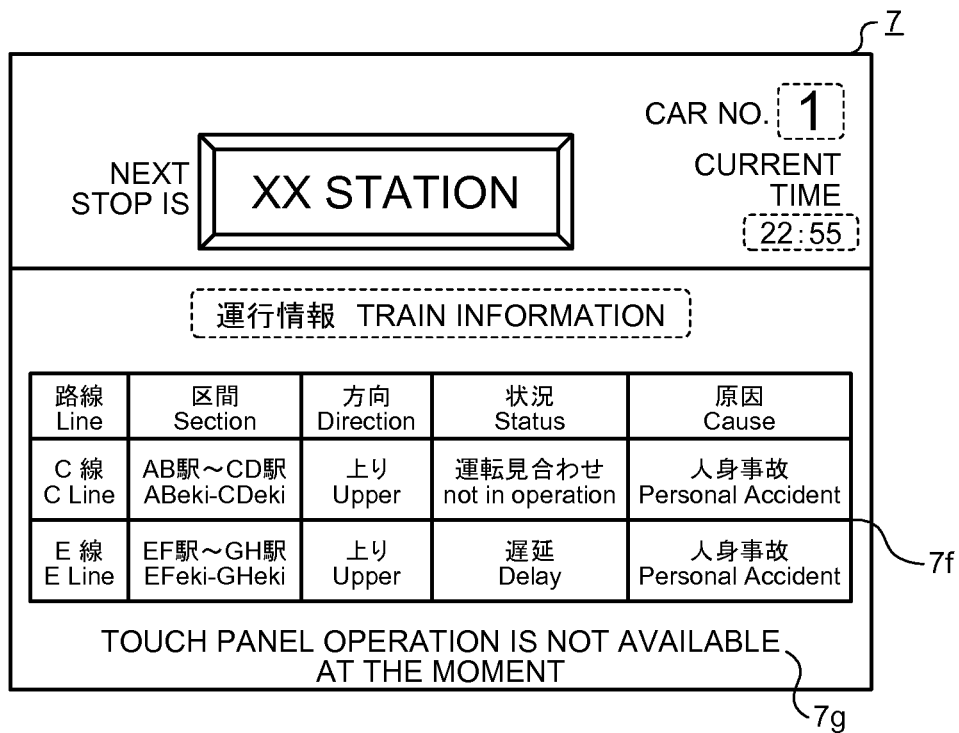
FIG. 9 is an example of guidance information displayed by the information control unit according to the second embodiment.

FIG. 8 is an explanatory diagram of a display operation performed by the information control unit according to the second embodiment. FIG. 9 is an example of guidance information displayed by the information control unit according to the second embodiment and is an example of a "driving information" display screen displayed when touch operations from the passengers are not received.

FIG. 8 is an example of various types of guidance information to be switched and displayed in the area of the section 7b after the vehicle 2 stops at A Station and before the vehicle 2 stops at B Station as the next stop. In this example, a touch-panel operable period and a touch-panel inoperable period are previously defined in the information control unit 10, so that the information control unit 10 performs an operation shown below.

For example, as shown in FIG. 8, when a period when the vehicle is traveling except for a period when the vehicle is stopping and a period before the vehicle stops at the next station is defined in advance as the touch-panel operable period for the passengers, the information control unit 10 performs the same display switching operation as the operation according to the first embodiment of displaying on the display input unit 9 to which the touch operation is performed during the touch-panel operable period, various types of optional guidance information, which is obtained by eliminating the optionally-eliminated guidance information from various types of guidance information indicated in the touch-panel operable period in FIG. 8, as guidance information to which the touch operations can be performed.

On the other hand, when there is a touch operation during periods defined in advance as the touch-panel inoperable periods in FIG. 8 (the period when the vehicle is stopping and the period before the vehicle stops at the next station in FIG. 8), the information control unit 10 performs an operation of not receiving the input operation information from the input unit 8 not to perform the operation of displaying the optional guidance information even when there is a touch operation.

When such a timing that a touch operation is being performed during the touch-panel operable period and then the touch-panel inoperable period starts according to the traveling state of the vehicle 2 occurs, the information control unit 10 does not receive subsequent operations by the passengers and performs an operation of switching to the normal guidance-information display operation synchronously with a timing of switching to the touch-panel inoperable period. For example, when a passenger is acquiring the optional guidance information in a timing indicated by reference sign 7b19 in FIG. 8 and then the touch-panel inoperable period starts in a timing indicated by 7b20 according to the traveling status of the vehicle 2, the information control unit 10 performs an operation of deleting display of the optional guidance information having been displayed until then and performing switching display of the "opening door side guidance" information (7b20) as the normal guidance information on the display unit 7. While a method of performing the switching synchronously with a timing of display of the "opening door side guidance" information as the switching timing is conceivable in this case, the information control unit 10 can perform a control operation of automatically returning to the normal guidance-information display operation when no touch operation to the input unit 8 by the passengers has been performed for a certain period of time as explained in the operation according to the first embodiment.

The example in which the touch-panel operable period is the period when the vehicle is traveling in FIG. 8 has been explained above. While an operation of defining in advance the touch-panel operable period in the information control unit 10 when the vehicle 2 is in a depot before being driven can be considered as an example of a timing of defining the touch-panel operable period, the present embodiment is not limited thereto and the touch-panel operable period can be newly defined or changed in a certain timing during the driving (while the vehicle is stopping at stations or traveling).

It is possible to notify the passengers of a situation in which no touch operation cannot be performed during the touch-panel inoperable period by displaying some information (sign) to be superimposed on the various types of guidance information displayed on the display unit 7. For example, information shown in an area 7f in FIG. 9 is a display example of the "driving information" to be displayed on the display unit 7 at the timing indicated by 7b7 in FIG. 8. Such a message "Touch panel operation is not available at the moment" is superimposedly displayed under the "driving information" as an example of a fixed phrase or a fixed graphic for notifying the passengers of a situation in which a touch-operation is not available. By performing such a display operation in the information control unit 10, it is possible to notify the passengers of the situation in which no touch operation can be performed during the touch-panel inoperable period.

The information control unit 10 can preannounce inoperability and prompt the passengers to ensure their security before stopping of the vehicle by displaying some information (sign) to be superimposed on the optional guidance information from a certain period of time before the touch-panel inoperable period starts prior to stop at the next station. For example, information (sign) constituted by fixed phrases or fixed graphics for preannouncing the inoperability and prompting the passengers to ensure their security, such as "Touch panel is soon becoming inoperable" and "Please hang on a strap or be seated in preparation for stop", is displayed to be superimposed on the displayed optional guidance information from a certain period of time before the timing of displaying the "opening door side guidance" information indicated by 7b20 in FIG. 8. Preannouncement of the inoperability and prompt to the passengers to ensure their security before the vehicle stops can be achieved by the information control unit 10 performing such a display operation. A display location of the information (sign) to be superimposedly displayed at that time can be a part of the area of the display unit 7 as indicated by 7g in FIG. 9, for example. The information (sign) can be displayed in other areas in the display unit 7.

While the embodiment in which the passengers can perform the touch operations only under a specific driving status of the vehicle 2 is shown in FIG. 8, the touch-panel operable period and the touch-panel inoperable period can be defined separately for each of the display input units 9. For example, in the information control unit 10, the touch-panel operable period for one of the display input units 9 is set to enable the passengers to perform the touch operations only under a specific driving status and the touch-panel operable period for the other display input units 9 is set to enable the passengers to perform the touch operations during the whole period.

As described in the explanations of the operation, in the in-vehicle information system according to the present embodiment, a predetermined driving period of the vehicle is classified as the touch-panel operable period and the remaining period is classified as the touch-panel inoperable period in each of the display input units 9 mounted on the vehicle 2, and the information output unit 12 enables accesses to the optional guidance information during the touch-panel operable period and inhibits accesses to the optional guidance information during the touch-panel inoperable period. Accordingly, for example, by setting in advance such a definition that touch operations for the optional guidance information by the passengers cannot be performed on the display input units 9 installed near the open/close doors 3 during rush hours when changes of the passengers are intense, a situation in which a passenger performing a touch operation blocks other passengers near the open/close doors 3 can be prevented. In this way, the touch operation control of the display input unit 9 can be achieved considering the driving status of the vehicle 2 or changes in the boarding status at the installation locations.

The information output unit 12 causes the information indicating the inoperability to be superimposedly displayed as information (sign) visualized with a predetermined fixed phrase or a predetermined fixed graphic during the touch-panel inoperable period, thereby notifying the passengers of the situation where no touch operation can be performed. Therefore, the passengers can know in advance the situation where no touch operation can be performed to the display input unit 9.

Furthermore, the information output unit 12 superimposedly displays the information preannouncing the touch operation impossibility and the information prompting the users to ensure their security as the information (sign) visualized with predetermined fixed phrases or predetermined fixed graphics from a certain time period before the touch-panel inoperable period starts. Therefore, the passengers can know in advance the situation where no touch operation can be performed to the display input units 9 and voluntarily finish the touch operations to the display input units 9 to perform a safety action in association with approaching stop of the vehicle 2.

INDUSTRIAL APPLICABILITY

As described above, the present invention is applicable to an in-vehicle information system that notifies passengers in a rail vehicle of various types of guidance information as typified by driving information, and is particularly useful as an invention that enables to optionally acquire information desired by passengers from various types of guidance information.

REFERENCE SIGNS LIST

2 VEHICLE
3 OPEN/CLOSE DOOR
4 CONNECTION DOOR
5 INSTALLATION LOCATION OF DISPLAY INPUT UNIT (INSTALLED NEAR OPEN/CLOSE DOOR)
6 INSTALLATION LOCATION OF DISPLAY INPUT UNIT (INSTALLED NEAR CONNECTION DOOR)
7 DISPLAY UNIT
8 INPUT UNIT
9 DISPLAY INPUT UNIT
10 INFORMATION CONTROL UNIT
11 INFORMATION GENERATION UNIT
12 INFORMATION OUTPUT UNIT

The invention claimed is:

1. An in-vehicle information system that monitors a driving state of a vehicle and displays various types of information visualized on a display unit in the vehicle according to predetermined timings and the driving state, the in-vehicle information system comprising:
a display input unit covering a part or all of a screen area of the display unit and detecting touch operations as operation information; and
an information output unit that outputs the various types of information classified in advance into optional guidance information that can be displayed again by accessing the touch operation and optionally-eliminated guidance information that cannot be displayed again by accessing the touch operation, wherein the optional guidance information and the optionally-eliminated guidance information are different subsets of the various types of information,
displays the various types of information including both the optional guidance information and the optionally-eliminated guidance information on the display unit according to the predetermined timings when the input unit does not detect the operation information by the touch operation, and
displays again the optional guidance information, which has been previously displayed, on the display unit when the input unit detects the operation information by the touch operation.

2. The in-vehicle information system according to claim 1, wherein, at a time of display output of the optional guidance information to the display unit, the information output unit stops outputting the optional guidance information and automatically returns to a normal information display screen and a normal display operation that outputs the various types of guidance information including both the optional guidance information and the optionally-eliminated guidance information to the display unit according to said predetermined timings, when no touch operation has been received by the input unit by users after a predetermined period of time.

3. The in-vehicle information system according to claim 1, wherein
a plurality of the display input units to which touch operations can be performed are mounted on the vehicle, and
the information output unit automatically returns to the normal information display screen and the normal display operation that is synchronized with a normal information display switching timing of various types of information being displayed on other display input units that have not received a touch operation.

4. The in-vehicle information system according to claim 3, wherein, when an event requiring display of emergency guidance information to be transferred to the users occurs during an operation of synchronizing switching with the normal information display switching timing, the information output unit prioritizes switching to the emergency guidance information over waiting to synchronize display of the various types of information with the normal information display switching timing.

5. The in-vehicle information system according to claim 1, wherein
a touch-operation available area visualized with a predetermined fixed phrase or a predetermined fixed graphic is clearly indicated in a part of a screen area of the display unit, and
the information output unit outputs the optional guidance information desired by a user to the display unit according to a touch operation to the touch-operation available area.

6. The in-vehicle information system according to claim 1, wherein
a touch-operation available area visualized with a translucent predetermined fixed phrase or a translucent predetermined fixed graphic is clearly indicated in a part of a screen area of the display unit, and
the information output unit outputs the optional guidance information desired by a user to the display unit according to a touch operation to the touch-operation available area.

7. The in-vehicle information system according to claim 1, wherein
a transparent touch-operation available area is provided in a part of a screen area of the display unit, and
the information output unit outputs the optional guidance information desired by a user to the display unit according to a touch operation to the touch-operation available area.

8. The in-vehicle information system according to claim 1, wherein
a transparent touch-operation available area is provided in a part or all of a screen area of the display unit, and
the information output unit outputs the optional guidance information desired by a user to the display unit according to a direction of a touch operation.

9. The in-vehicle information system according to claim 1, wherein
a transparent touch-operation available area is provided in a part or all of a screen area of the display unit, and
the information output unit outputs the optional guidance information desired by a user to the display unit according to a direction and an acceleration of a touch operation.

10. The in-vehicle information system according to claim 1, wherein
a predetermined driving period of the vehicle is classified as a touch-panel operable period and the other period is classified as a touch-panel inoperable period, in the display input unit, and
the information output unit enables access to the optional guidance information during the touch-panel operable period and inhibits access to the optional guidance information during the touch-panel inoperable period.

11. The in-vehicle information system according to claim 10, wherein the information output unit causes superimposed display of information indicating inoperability as information visualized with a predetermined fixed phrase or a predetermined fixed graphic during the touch-panel inoperable period.

12. The in-vehicle information system according to claim 10, wherein the information output unit causes superimposed display of information preannouncing impossibility of touch operations and information prompting the users to ensure security as information visualized with predetermined fixed phrases or predetermined fixed graphics from a timing that is a predetermined period before the touch-panel inoperable period starts.

13. The in-vehicle information system according to claim 2, wherein
a plurality of the display input units to which touch operations can be performed are mounted on the vehicle, and
the information output unit automatically returns to the normal information display screen and the normal display operation that is synchronized with a normal information display switching timing of various types of information being displayed on other display input units that have not received a touch operation.

14. The in-vehicle information system according to claim 13, wherein, wherein, when an event requiring display of emergency guidance information to be transferred to the users occurs during an operation of synchronizing switching with the normal information display switching timing, the information output unit prioritizes switching to the emergency guidance information over waiting to synchronize display of the various types of information with the normal information display switching timing.

15. The in-vehicle information system according to claim 2, wherein
a touch-operation available area visualized with a predetermined fixed phrase or a predetermined fixed graphic is clearly indicated in a part of a screen area of the display unit, and
the information output unit outputs the optional guidance information desired by a user to the display unit according to a touch operation to the touch-operation available area.

16. The in-vehicle information system according to claim 2, wherein
a touch-operation available area visualized with a translucent predetermined fixed phrase or a translucent predetermined fixed graphic is clearly indicated in a part of a screen area of the display unit, and
the information output unit outputs the optional guidance information desired by a user to the display unit according to a touch operation to the touch-operation available area.

17. The in-vehicle information system according to claim 2, wherein
a transparent touch-operation available area is provided in a part of a screen area of the display unit, and
the information output unit outputs the optional guidance information desired by a user to the display unit according to a touch operation to the touch-operation available area.

18. The in-vehicle information system according to claim 2, wherein
a transparent touch-operation available area is provided in a part or all of a screen area of the display unit, and
the information output unit outputs the optional guidance information desired by a user to the display unit according to a direction of a touch operation having a direction.

19. The in-vehicle information system according to claim 2, wherein
a transparent touch-operation available area is provided in a part or all of a screen area of the display unit, and
the information output unit outputs the optional guidance information desired by a user to the display unit according to a direction and an acceleration of a touch operation.

20. The in-vehicle information system according to claim 2, wherein
a predetermined driving period of the vehicle is classified as a touch-panel operable period and the other period is classified as a touch-panel inoperable period, in the display input unit, and
the information output unit enables access to the optional guidance information during the touch-panel operable period and inhibits access to the optional guidance information during the touch-panel inoperable period.

21. The in-vehicle information system according to claim 20, wherein the information output unit causes superimposed display of information indicating inoperability as information visualized with a predetermined fixed phrase or a predetermined fixed graphic during the touch-panel inoperable period.

22. The in-vehicle information system according to claim 20, wherein the information output unit causes superimposed display of information preannouncing impossibility of touch operations and information prompting the users to ensure security as information visualized with predetermined fixed phrases or predetermined fixed graphics from a timing that is a predetermined period before the touch-panel inoperable period starts.

* * * * *